(12) United States Patent
Tsuzuki et al.

(10) Patent No.: US 9,162,632 B2
(45) Date of Patent: Oct. 20, 2015

(54) PATTERNED PRESSURE-SENSITIVE ADHESIVE BODY AND PRODUCING METHOD THEREOF

(71) Applicant: NITTO DENKO CORPORATION, Osaka (JP)

(72) Inventors: Yoshikazu Tsuzuki, Osaka (JP); Yoshimasa Nishida, Osaka (JP); Takafumi Suzuki, Osaka (JP); Hiromitsu Morishita, Osaka (JP); Masayoshi Natsume, Osaka (JP); Shuuji Sugimoto, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 48 days.

(21) Appl. No.: 14/038,151

(22) Filed: Sep. 26, 2013

(65) Prior Publication Data
US 2014/0093666 A1    Apr. 3, 2014

(30) Foreign Application Priority Data
Sep. 28, 2012    (JP) .................................. 2012-217628

(51) Int. Cl.
*B29C 65/48* (2006.01)
*B32B 37/15* (2006.01)
(Continued)

(52) U.S. Cl.
CPC .............. *B60R 13/005* (2013.01); *B32B 37/14* (2013.01); *C09J 7/00* (2013.01); *C09J 2201/28* (2013.01); *C09J 2201/606* (2013.01);
(Continued)

(58) Field of Classification Search
CPC ....... B60R 13/005; C09J 7/00; C09J 2201/28; C09J 2201/606; Y10T 156/1062; Y10T 156/108; Y10T 156/1082; Y10T 156/1084; Y10T 156/11; G09F 7/16; G09F 7/18; G09F 2007/127; B32B 7/06; B32B 37/12; B32B 37/14; B32B 37/26; B32B 38/0004; B32B 38/10; B32B 38/185
USPC ................... 156/247, 249, 250, 267–269, 289
See application file for complete search history.

(56) References Cited

U.S. PATENT DOCUMENTS

| | | | | |
|---|---|---|---|---|
| 5,383,996 | A  * | 1/1995 | Dressler | 156/234 |
| 6,388,231 | B1 * | 5/2002 | Andrews | 219/121.69 |
| 2005/0084641 | A1 | 4/2005 | Downs et al. | |

FOREIGN PATENT DOCUMENTS

| | | |
|---|---|---|
| DE | 2236153 | 2/1974 |
| JP | 2005-238434 A | 9/2005 |
| WO | WO-2005-105442 A1 | 11/2005 |

OTHER PUBLICATIONS

Machine Translation of JP 2005-238434 (Mar. 24, 2015).*
(Continued)

*Primary Examiner* — Sing P Chan
(74) *Attorney, Agent, or Firm* — Jean C. Edwards, Esq.; Edwards Neils PLLC (57) ABSTRACT

A method for producing a patterned pressure-sensitive adhesive body includes a pattern forming step of cutting a pressure-sensitive adhesive layer in a pressure-sensitive adhesive film including a first release film and the pressure-sensitive adhesive layer laminated on one surface of the first release film so as to form a first slit in a pattern shape and an outer frame forming step of cutting the first release film and the pressure-sensitive adhesive layer so as to form a second slit in an outer frame shape surrounding the pattern shape. The second slit has a discontinuous portion in a cutting direction.

5 Claims, 5 Drawing Sheets

(51) Int. Cl.
  *B32B 37/26* (2006.01)
  *B32B 38/04* (2006.01)
  *B60R 13/00* (2006.01)
  *C09J 7/00* (2006.01)
  *B32B 37/14* (2006.01)

(52) U.S. Cl.
  CPC ....... *Y10T 83/0341* (2015.04); *Y10T 156/1062* (2015.01); *Y10T 156/11* (2015.01)

(56) References Cited

OTHER PUBLICATIONS

Extended European Search Report issued by the European Patent Office (EPO) on Jan. 17, 2014 in connection with European Patent Application No. 13185850.8.

* cited by examiner

FIG. 5

PATTERNED PRESSURE-SENSITIVE ADHESIVE BODY AND PRODUCING METHOD THEREOF

CROSS-REFERENCE TO RELATED APPLICATION

The present application claims priority from Japanese Patent Application No. 2012-217628 filed on Sep. 28, 2012, the contents of which are hereby incorporated by reference into this application.

BACKGROUND OF THE INVENTION

1. Field of the Invention

The present invention relates to a patterned pressure-sensitive adhesive body and a producing method thereof, to be specific, to a patterned pressure-sensitive adhesive body preferably used for an emblem or the like to be attached to the exterior of an automobile and a producing method thereof.

2. Description of Related Art

In order to attach an emblem used for the exterior of an automobile or the like to an automobile body, a double-coated pressure-sensitive adhesive tape or the like has been conventionally used. That is, one surface of the double-coated pressure-sensitive adhesive tape is attached to the emblem and the other surface thereof is attached to the automobile body and in this way, the emblem is fixed to the automobile body.

The double-coated pressure-sensitive adhesive tape is usually formed into the same pattern as that of the emblem. The double-coated pressure-sensitive adhesive tape is distributed as a product in a state of being sandwiched between two pieces of release films and the release films are peeled off at the time of its use.

In order to produce the patterned double-coated pressure-sensitive adhesive tape, for example, patterns are continuously formed in a long-length double-coated pressure-sensitive adhesive tape that is continuously conveyed by a roll-to-roll process and finally, the double-coated pressure-sensitive adhesive tapes are individually stamped out per one pattern (per one product) to be taken out.

To be specific, first, a long-length laminated tape in which a double-coated pressure-sensitive adhesive tape and a cover film having release properties are sequentially laminated on the surface of a substrate film having release properties is prepared. Next, the obtained laminated tape is continuously conveyed and the cover film and the double-coated pressure-sensitive adhesive tape only are cut (subjected to half cut) so as to form a desired pattern (for example, a pattern of an emblem) and next, the laminated tape is completely stamped out (subjected to full cut) with a mold of an outer frame that surrounds one pattern so as to be divided per one pattern (one product). Finally, of the laminated tapes that are stamped out, a residue (an unnecessary portion excluding the patterns in the pressure-sensitive adhesive layer and the cover film) is removed, so that the patterned double-coated pressure-sensitive adhesive tape for an emblem to be served as a product is obtained.

The residue is, however, removed manually, so that the production efficiency is low.

Thus, as a method for removing the residue easily and accurately, Japanese Unexamined Patent Publication No. 2005-238434 has been known.

In Japanese Unexamined Patent Publication No. 2005-238434, a method in which a dividing line for a residue for cutting a film residue into a plurality of pieces is cut in the film residue with a cutting plotter has been proposed.

According to this method, the film residue is capable of being efficiently removed.

SUMMARY OF THE INVENTION

In the method described in Japanese Unexamined Patent Publication No. 2005-238434, however, the film residue is required to be removed manually in the end. Thus, there is a limit in achieving the improvement of the production efficiency.

It is an object of the present invention to provide a method for producing a patterned pressure-sensitive adhesive body that is capable of improving the production efficiency and the patterned pressure-sensitive adhesive body.

A method for producing a patterned pressure-sensitive adhesive body of the present invention includes a pattern forming step of cutting a pressure-sensitive adhesive layer in a pressure-sensitive adhesive film including a first release film and the pressure-sensitive adhesive layer laminated on one surface of the first release film so as to form a first slit in a pattern shape and an outer frame forming step of cutting the first release film and the pressure-sensitive adhesive layer so as to form a second slit in an outer frame shape surrounding the pattern shape, wherein the second slit has a discontinuous portion in a cutting direction.

Thus, when an outer-side pressure-sensitive adhesive layer that is disposed at the outer side of the second slit is peeled from the first release film, simultaneously, an inner-side pressure-sensitive adhesive layer (a residue) that is disposed at the inner side of the second slit and at the outer side of the first slit is capable of being peeled from the first release film via the discontinuous portion.

In the method for producing a patterned pressure-sensitive adhesive body of the present invention, it is preferable that after the pattern forming step and the outer frame forming step, an outer-side pressure-sensitive adhesive layer that is disposed at the outer side of the second slit and an inner-side pressure-sensitive adhesive layer that is continuous to the outer-side pressure-sensitive adhesive layer via the discontinuous portion and is disposed at the inner side of the second slit are peeled from the first release film.

Thus, the manual operation of peeling off the inner-side pressure-sensitive adhesive layer (the residue) is capable of being reduced or omitted, so that the production efficiency of the patterned pressure-sensitive adhesive body is capable of being substantially improved.

In the method for producing a patterned pressure-sensitive adhesive body of the present invention, it is preferable that the second release film is laminated on one surface of the pressure-sensitive adhesive layer; in the pattern forming step, the pressure-sensitive adhesive layer and the second release film are cut so as to form the first slit; and in the outer frame forming step, the first release film, the pressure-sensitive adhesive layer, and the second release film are cut so as to form the second slit.

Thus, when the outer-side pressure-sensitive adhesive layer and an outer-side second release film that are disposed at the outer side of the second slit are peeled from the first release film, simultaneously, the inner-side pressure-sensitive adhesive layer and an inner-side second release film (residues) that are disposed at the inner side of the second slit and at the outer side of the first slit are capable of being peeled from the first release film via the discontinuous portion.

In the method for producing a patterned pressure-sensitive adhesive body of the present invention, it is preferable that after the pattern forming step and the outer frame forming step, an outer-side second release film that is disposed at the outer side of the second slit and an inner-side second release film that is continuous to the outer-side second release film via the discontinuous portion and is disposed at the inner side of the second slit are peeled from the pressure-sensitive adhesive layer and an outer-side pressure-sensitive adhesive layer that is disposed at the outer side of the second slit and an inner-side pressure-sensitive adhesive layer that is continuous to the outer-side pressure-sensitive adhesive layer via the discontinuous portion and is disposed at the inner side of the second slit are peeled from the first release film.

Thus, the manual operation of peeling off the inner-side pressure-sensitive adhesive layer and the inner-side second release film (the residues) is capable of being reduced or omitted, so that the production efficiency of the patterned pressure-sensitive adhesive body is capable of being substantially improved.

In the method for producing a patterned pressure-sensitive adhesive body of the present invention, it is preferable that the pattern forming step and the outer frame forming step are simultaneously performed.

Thus, the production efficiency of the patterned pressure-sensitive adhesive body is further improved.

A patterned pressure-sensitive adhesive body of the present invention is obtained by the above-described method for producing a patterned pressure-sensitive adhesive body.

The method for producing a patterned pressure-sensitive adhesive body of the present invention includes the pattern forming step of cutting the pressure-sensitive adhesive layer in the pressure-sensitive adhesive film including the first release film and the pressure-sensitive adhesive layer laminated on the one surface of the first release film so as to form the first slit in a pattern shape and the outer frame forming step of cutting the first release film and the pressure-sensitive adhesive layer so as to form the second slit in an outer frame shape surrounding the pattern shape, and the second slit has the discontinuous portion in the cutting direction.

Thus, when the outer-side pressure-sensitive adhesive layer that is disposed at the outer side of the second slit is peeled from the first release film, simultaneously, the inner-side pressure-sensitive adhesive layer that is disposed at the inner side of the second slit via the discontinuous portion is capable of being peeled from the first release film.

As a result, the manual operation of peeling off the inner-side pressure-sensitive adhesive layer is capable of being reduced or omitted, so that the production efficiency of the patterned pressure-sensitive adhesive body is capable of being substantially improved.

DETAILED DESCRIPTION OF THE INVENTION

1. Production Device

A production device 1 used in one embodiment of a method for producing a patterned pressure-sensitive adhesive body 30 is described with reference to FIG. 1.

The production device 1 for the patterned pressure-sensitive adhesive body 30 includes a stamped-out portion 2 and a residue-removing portion 3.

The stamped-out portion 2 includes a pressure-sensitive adhesive film-sending roll 4, a cover film-sending roll 5, a punching machine 6, a first laminated roll 8a, a second laminated roll 8b, a first tension roll 9, and a cover film-winding roll 10.

The pressure-sensitive adhesive film-sending roll 4 is a roll for sending a pressure-sensitive adhesive film 20. In the pressure-sensitive adhesive film-sending roll 4, the pressure-sensitive adhesive film 20 is wound around the surface of the roll so that the pressure-sensitive adhesive surface (the surface of a pressure-sensitive adhesive layer 23) thereof is in contact with the surface of the roll. The pressure-sensitive adhesive film-sending roll 4 is disposed at the most upstream side in a conveying direction.

The cover film-sending roll 5 is a roll for sending a release cover film 21 as a second release film. In the cover film-sending roll 5, the release cover film 21 is wound around the surface of the roll so that the surface thereof having release properties is in contact with the surface of the roll. The cover film-sending roll 5 is disposed in opposed relation to the upper side of the pressure-sensitive adhesive film-sending roll 4.

A first reversing roll 17a is a roll for reversing the pressure-sensitive adhesive film 20 that is sent from the pressure-sensitive adhesive film-sending roll 4 so as to allow the pressure-sensitive adhesive surface thereof to face upwardly and conveying the pressure-sensitive adhesive film 20 to the downstream side in the conveying direction. The first reversing roll 17a is disposed in opposed relation to the upper side of the pressure-sensitive adhesive film-sending roll 4.

A second reversing roll 17b is a roll for reversing the release cover film 21 that is sent from the cover film-sending roll 5 so as to allow the release-treated surface thereof to face downwardly and conveying the release cover film 21 to the downstream side in the conveying direction. The second reversing roll 17b is disposed in opposed relation to the lower side of the cover film-sending roll 5. The size of the second reversing roll 17b is generally the same as that of the first reversing roll 17a.

The first laminated roll 8a, along with the second laminated roll 8b, is a roll for fabricating a laminate (a first laminate 31) by laminating the pressure-sensitive adhesive film 20 sent from the pressure-sensitive adhesive film-sending roll 4 and the release cover film 21 sent from the cover film-sending roll 5. The first laminated roll 8a is positioned at the downstream side in the conveying direction of the first reversing roll 17a.

The second laminated roll 8b is positioned at the downstream side in the conveying direction of the second reversing roll 17b and is disposed in opposed relation at slightly spaced intervals to the upper side of the first laminated roll 8a. The size of the second laminated roll 8b is generally the same as that of the first laminated roll 8a.

The punching machine 6 is, at the downstream side in the conveying direction of the first laminated roll 8a and the second laminated roll 8b, disposed at the upper side of the laminate that is conveyed. The punching machine 6 is, as shown by an arrow in FIG. 1, capable of moving in the up-down direction.

The punching machine 6 includes a punching board 11 and a punching blade 12 that is integrally provided in the punching board 11.

The punching board 11 is formed into a generally rectangular shape in plane view having a predetermined thickness and is formed of a metal.

The punching blade 12 includes a first blade 12a and a second blade 12b. As the punching blade 12, a Thomson blade is used.

The first blade 12a is configured to be capable of forming first slits 41 in pattern shapes in the laminate. To be specific, the length of the first blade 12a is formed to be longer than the total thickness of the release cover film 21 and the pressure-sensitive adhesive layer 23 (described later). The blade shape (the shape in plane view of the edge) of the first blade 12a is formed to have a desired pattern (for example, letters, figures, or codes) in plane view. The first blade 12a may be composed of a plurality of blades in accordance with a desired pattern shape.

The second blade 12b is configured to be capable of forming second slits 42 in outer frame shapes in the laminate. The length of the second blade 12b is formed to be longer than that of the first blade 12a and is also formed to be longer than the total thickness of the release cover film 21, the pressure-sensitive adhesive layer 23, and a release substrate film 22 (described later).

The shape in plane view (the blade shape) of the second blade 12b is a generally rectangular shape (a rectangle) composed of two sides that are formed along the conveying direction at spaced intervals to each other and two sides that are formed along a direction perpendicular to the conveying direction at spaced intervals to each other. The size thereof is formed so as to include the pattern shape of the first blade 12a. That is, the second blade 12b is formed at the outer side of the first blade 12a.

The generally rectangular shape has discontinuous portions in a cutting direction. That is, the generally rectangular shape is composed of an intermittent line in which a part thereof is cut by a slight gap. That is, the second blade 12b is, in the discontinuous portions, formed so as to be chipped.

The discontinuous portions of the edge of the second blade 12b are formed in both of the sides in the conveying direction and the sides in the direction perpendicular to the conveying direction. The discontinuous portions in the sides in the direction perpendicular to the conveying direction are formed to be denser than those in the sides in the conveying direction.

The length of each of the discontinuous portions (the interval between gaps) of the edge of the second blade 12b is, for example, 0.1 mm or more, preferably 0.5 mm or more, or furthermore 1 mm or more, and is, for example, 20 mm or less, preferably 10 mm or less, or furthermore 5 mm or less.

The number of the discontinuous portions is, in the sides (the long sides) in the conveying direction, per one side, for example, 1 or more, preferably 2 or more, or more preferably 5 or more, and is, for example, 100 or less, preferably 80 or less, or more preferably 50 or less.

The number of the discontinuous portions is, in the sides (the short sides) in the direction perpendicular to the conveying direction, per one side, for example, 1 or more, preferably 2 or more, or more preferably 5 or more, and is, for example, 100 or less, preferably 80 or less, or more preferably 50 or less.

The punching machine 6 includes a support 7 that is disposed at the lower side of the punching board 11 so as to sandwich the laminate with the punching board 11. The support 7 is formed into a flat plate shape and is formed into a size that includes the punching board 11 in plane view.

The first tension roll 9 is disposed at the downstream side in the conveying direction of the punching machine 6 so as to be in contact with the laminate.

The cover film-winding roll 10 is disposed at the downstream side in the conveying direction of the punching machine 6 and is disposed above the first tension roll 9.

The residue-removing portion 3 includes a third laminated roll 14, a residue-removing film-sending roll 13, a second tension roll 16, and a residue-removing film-winding roll 15.

The third laminated roll 14 is disposed at the downstream side in the conveying direction of the first tension roll 9. The third laminated roll 14 is configured to be capable of laminating a residue-removing film 36 that is sent from the residue-removing film-sending roll 13 on the laminate.

The residue-removing film-sending roll 13 is disposed at the downstream side in the conveying direction of the first tension roll 9 and is disposed above the third laminated roll 14. The residue-removing film 36 is wound around the surface of the residue-removing film-sending roll 13. The residue-removing film 36 is sent from the surface toward the third laminated roll 14.

The second tension roll 16 is disposed at the downstream side in the conveying direction of the third laminated roll 14 so as to be in contact with the laminate.

The residue-removing film-winding roll 15 is disposed at the downstream side in the conveying direction of the third laminated roll 14 and is disposed above the second tension roll 16.

2. Method for Producing Patterned Pressure-Sensitive Adhesive Body

One embodiment of a method for producing the patterned pressure-sensitive adhesive body 30 is described with reference to FIGS. 1, 2, and 3.

The method for producing the patterned pressure-sensitive adhesive body 30 includes (1) a step of preparing the pressure-sensitive adhesive film 20 and the release cover film 21, (2) a step of laminating the release cover film 21 on the pressure-sensitive adhesive film 20 to obtain the first laminate 31, (3) a step of forming the first slits 41 and the second slits 42 in the first laminate 31 to obtain a second laminate 32, (4) a step of peeling an outer-side cover film 25a and inner-side cover films 25b from the second laminate 32 to obtain a third laminate 33, (5) a step of laminating the residue-removing film 36 on the third laminate 33 to obtain a fourth laminate 34, (6) a step of peeling an outer-side pressure-sensitive adhesive layer 27a and inner-side pressure-sensitive adhesive layers 27b, along with the residue-removing film 36, from the fourth laminate 34 to obtain a fifth laminate 35, and (7) a step of taking out each of the patterned pressure-sensitive adhesive bodies 30 from the fifth laminate 35.

First, the pressure-sensitive adhesive film 20 and the release cover film 21 are prepared.

The pressure-sensitive adhesive film 20 includes the release substrate film 22 as a first release film and the pressure-sensitive adhesive layer 23 that is laminated on one surface thereof.

The surface at one side of the release substrate film 22 has release properties and the release substrate film 22 is formed into a long-length generally flat belt shape. As the release substrate film 22, for example, a film in which a release treating agent is applied and dried at the surface of a substrate film can be used.

Examples of the substrate film include paper such as wood free paper, kraft paper, glassine paper, plastic laminated paper; a plastic film such as polyethylene (high-density polyethylene, low-density polyethylene, linear low-density polyethylene, and the like), polypropylene, polyester (polyethylene terephthalate and the like), polyamide (nylon and the like), α-olefin copolymer, poly-4-methyl-1-pentene, polystyrene, polyvinyl chloride, and fluorine-based; and a metal foil such as aluminum foil and stainless steel foil.

Preferably, polyethylene, polypropylene, and polyester are used. When the polyester is used, preferably, polyethylene terephthalate is used.

These above-described substrates may be used alone or in combination of two or more.

The substrate may be formed of one layer or a plurality of layers.

Examples of the release treating agent include a silicone-based release treating agent, a fluorine-based release treating agent, and a long-chain alkyl-based release treating agent.

When the material such as a plastic film itself has release properties, for example, the release treating agent is not applied and the material itself is capable of being used as the release substrate film 22.

The thickness of the release substrate film 22 is, for example, 0.025 mm or more, preferably 0.03 mm or more, or more preferably 0.05 mm or more, and is, for example, 0.20 mm or less, preferably 0.15 mm or less, or more preferably 0.13 mm or less.

By setting the thickness of the release substrate film 22 to be 0.025 mm or more, in the pattern forming step, the reaching (full cut) of the first blade 12a to the lower surface of the release substrate film 22 is capable of being prevented. Also, in the obtained patterned pressure-sensitive adhesive body 30, the release substrate film 22 is capable of being easily peeled off, so that it has excellent handling ability. On the other hand, by setting the thickness of the release substrate film 22 to be 0.20 mm or less, the production cost is reduced. After the use of the patterned pressure-sensitive adhesive body 30, the release substrate film 22 is disposed of, so that the amount of waste disposal can be reduced, leading to a reduction in the environmental load.

The pressure-sensitive adhesive layer 23 is composed of a long-length layer having pressure-sensitive adhesive properties on both surfaces thereof. The pressure-sensitive adhesive layer 23 is formed into the same shape as that of the release substrate film 22.

Examples of the pressure-sensitive adhesive layer 23 include a substrate-including double-coated pressure-sensitive adhesive tape in which the pressure-sensitive adhesive layers 23 are laminated on both surfaces of a substrate and a substrate-less double-coated pressure-sensitive adhesive tape that is formed of the pressure-sensitive adhesive layer 23 only. Preferably, in view of pressure-sensitive adhesive properties, a substrate-less double-coated pressure-sensitive adhesive tape is used.

Examples of the substrate used in the substrate-including double-coated pressure-sensitive adhesive tape include a non-woven fabric, paper, a plastic film, and a metal foil.

The pressure-sensitive adhesive layer 23 is formed from a pressure-sensitive adhesive composition. As the pressure-sensitive adhesive composition, preferably, a bubble-containing pressure-sensitive adhesive composition is used.

The content rate of a bubble in the pressure-sensitive adhesive composition is, for example, 10 volume % or more, preferably 11 volume % or more, or more preferably 12 volume % or more, and is, for example, 50 volume % or less, preferably 45 volume % or less, or more preferably 40 volume % or less.

Preferably, the pressure-sensitive adhesive composition contains hollow microspheres.

Examples of the hollow microspheres may include hollow inorganic microspheres and hollow organic microspheres. To be specific, examples of the hollow inorganic microspheres include a hollow balloon made of glass such as a hollow glass balloon, a hollow balloon made of a metal compound such as a hollow aluminum balloon, and a hollow balloon made of porcelain such as a hollow ceramic balloon. An example of the hollow organic microspheres includes a hollow balloon made of a resin such as a hollow acrylic balloon and a hollow vinylidene chloride balloon. Preferably, a hollow glass balloon is used.

By containing the hollow microspheres, the adhesive properties are improved and the cutting properties at the time of being cut with respect to the pressure-sensitive adhesive layer 23 are improved.

The particle size (the average particle size) of each of the hollow microspheres is not particularly limited and is, for example, 1 μm or more, preferably 5 μm or more, or more preferably 10 μm or more, and is, for example, 500 μm or less, preferably 200 μm or less, or more preferably 100 μm or less.

As the pressure-sensitive adhesive composition and the method for producing the pressure-sensitive adhesive layer 23 formed from the pressure-sensitive adhesive composition, for example, a composition and a producing method described in Japanese Unexamined Patent Publications No. 2005-179561 and No. 2006-22189 can be used.

The thickness of the pressure-sensitive adhesive layer 23 is, for example, 0.2 mm or more, or preferably 0.4 mm or more, and is, for example, 4 mm or less, or preferably 2 mm or less.

The pressure-sensitive adhesive film 20 is capable of being obtained by, for example, attaching the pressure-sensitive adhesive layer 23 (a pressure-sensitive adhesive tape) to the release substrate film 22 or by, for example, applying a pressure-sensitive adhesive composition to the release substrate film 22 to be dried.

The pressure-sensitive adhesive layer 23 completely coincides with the release substrate film 22 when projected in the thickness direction. That is, the side surfaces of the end portion in the widthwise direction of the pressure-sensitive adhesive layer 23 are, in the thickness direction, flush with the side surfaces of the end portion in the widthwise direction of the release substrate film 22.

The surface at one side of the release cover film 21 has release properties and the release cover film 21 is formed into a long-length generally flat belt shape. As the release cover film 21, for example, the same material as that of the release substrate film 22 can be used.

The release cover film 21 is fabricated so as to be capable of being easily peeled off with respect to the pressure-sensitive adhesive layer 23, compared to the release substrate film 22. To be specific, the release cover film 21 and the release substrate film 22 are set so that in a case where the release cover film 21 is attached to one surface of the pressure-sensitive adhesive layer 23 and the release substrate film 22 is attached to the other surface of the pressure-sensitive adhesive layer 23, the peeling force (the peeling force of substrate) of peeling the release substrate film 22 from the pressure-sensitive adhesive layer 23 is larger than the peeling force (the peeling force of cover) of peeling the release cover film 21 from the pressure-sensitive adhesive layer 23.

The peeling force of substrate with respect to the peeling force of cover is, for example, twice or more, or preferably five times or more, and is, for example, 10 times or less. By setting the ratio within this range, when the release cover film 21 is peeled from the pressure-sensitive adhesive layer 23, a peeling at the interface between the pressure-sensitive adhesive layer 23 and the release substrate film 22 is capable of being reduced.

The peeling force is, for example, in the first laminate 31 (described later) in which the release cover film 21, the pressure-sensitive adhesive layer 23, and the release substrate film 22 are laminated, measured by the following peeling test. First, the first laminate 31 is cut into pieces each having a width of 50 mm to produce test pieces. Next, a film (the release cover film 21 or the release substrate film 22) that serves as an object to be peeled off in the test piece is pulled under an atmosphere of 23° C. and 60% RH in a 180 degree direction with a universal tensile testing machine at a cross head rate of 300 mm/min, so that the film that serves as an object to be peeled off is peeled from the pressure-sensitive adhesive layer 23. The resistance value at the time of being peeled off is measured and the maximum value at the initial time (beginning of peeling) of the measurement data is defined as the peeling force (unit: N/50 mm width).

When the width of the first laminate 31 is below 50 mm width, the measurement is also capable of being performed as follows: the above-described measurement is performed by a plurality of different widths and then, the obtained measurement value is converted into a 50 mm width.

The length in the widthwise direction (the direction perpendicular to the conveying direction) of the release cover film 21 is formed to be slightly longer than the length in the widthwise direction of the pressure-sensitive adhesive layer 23.

The thickness of the release cover film 21 is, for example, 0.05 mm or more, or preferably 0.07 mm or more, and is, for example, 0.20 mm or less, or preferably 0.18 mm or less.

By setting the thickness of the release cover film 21 to be 0.05 mm or more, in the obtained patterned pressure-sensitive adhesive body 30, the release cover film 21 is capable of being easily peeled off, so that it has excellent handling ability. On the other hand, by setting the thickness of the release cover film 21 to be 0.20 mm or less, the production cost is reduced. After the use of the patterned pressure-sensitive adhesive body 30, the release cover film 21 is disposed of, so that the amount of waste disposal can be reduced, leading to a reduction in the environmental load.

The pressure-sensitive adhesive film 20 prepared in this way is wound around the pressure-sensitive adhesive film-sending roll 4 so that the surface of the pressure-sensitive adhesive layer 23 is in contact with the surface of the roll and the surface of the release substrate film 22 is exposed outwardly from the roll (so that the pressure-sensitive adhesive layer 23 is disposed at the inner side in the radial direction of the pressure-sensitive adhesive film-sending roll 4 with respect to the release substrate film 22). On the other hand, the release cover film 21 is wound around the cover film-sending roll 5 so that the surface thereof having release properties is in contact with the surface of the roll (so that the surface thereof having release properties is disposed at the inner side in the radial direction of the cover film-sending roll 5 with respect to the back surface thereof).

Next, the release cover film 21 is laminated on the pressure-sensitive adhesive film 20, so that the first laminate 31 is obtained. To be specific, the release cover film 21 is brought into contact with the one surface (the surface side of the pressure-sensitive adhesive layer 23) of the pressure-sensitive adhesive film 20 to be attached to each other.

First, the pressure-sensitive adhesive film 20 that is wound around the pressure-sensitive adhesive film-sending roll 4 is sent toward the upper side and the upstream side in the conveying direction and is allowed to pass through the side surface at the upstream side in the conveying direction of the first reversing roll 17a so that the release substrate film 22 is in contact with the first reversing roll 17a.

Next, the pressure-sensitive adhesive film 20 that passes through the side surface at the upstream side in the conveying direction of the first reversing roll 17a is conveyed toward the downstream side in the conveying direction in a state where the pressure-sensitive adhesive layer 23 is positioned at the upper side with respect to the release substrate film 22. Then, the pressure-sensitive adhesive film 20 is allowed to pass through between the first laminated roll 8a and the second laminated roll 8b so that the release substrate film 22 is in contact with the upper surface of the first laminated roll 8a. At this time, the pressure-sensitive adhesive film 20 is conveyed gradually toward the upper side, as it goes from the first reversing roll 17a toward the downstream side in the conveying direction. After the pressure-sensitive adhesive film 20 passes through the upper side of the first laminated roll 8a, it is horizontally conveyed in the conveying direction.

Also, the release cover film 21 that is wound around the cover film-sending roll 5 is sent toward the lower side and the upstream side in the conveying direction and is allowed to pass through the side surface at the upstream side in the conveying direction of the second reversing roll 17b so that the surface (the back surface) that is the opposite side to the surface having release properties is in contact with the second reversing roll 17b.

Next, the release cover film 21 that passes through the side surface at the upstream side in the conveying direction of the second reversing roll 17b is conveyed toward the downstream side in the conveying direction in a state where the surface thereof having release properties is positioned at the lower side with respect to the back surface thereof. Then, the release cover film 21 is allowed to pass through between the first laminated roll 8a and the second laminated roll 8b so that the back surface thereof is in contact with the lower surface of the second laminated roll 8b. At this time, the release cover film 21 is conveyed gradually toward the lower side, as it goes from the second reversing roll 17b toward the downstream side in the conveying direction. After the release cover film 21 passes through the lower side of the second laminated roll 8b, it is horizontally conveyed toward the downstream side in the conveying direction.

When the pressure-sensitive adhesive film 20 and the release cover film 21 pass through a slight gap between the first laminated roll 8a and the second laminated roll 8b, the release cover film 21 comes in contact with the upper side surface (that is, the pressure-sensitive adhesive layer 23) of the pressure-sensitive adhesive film 20 to be attached.

Figure 2A:
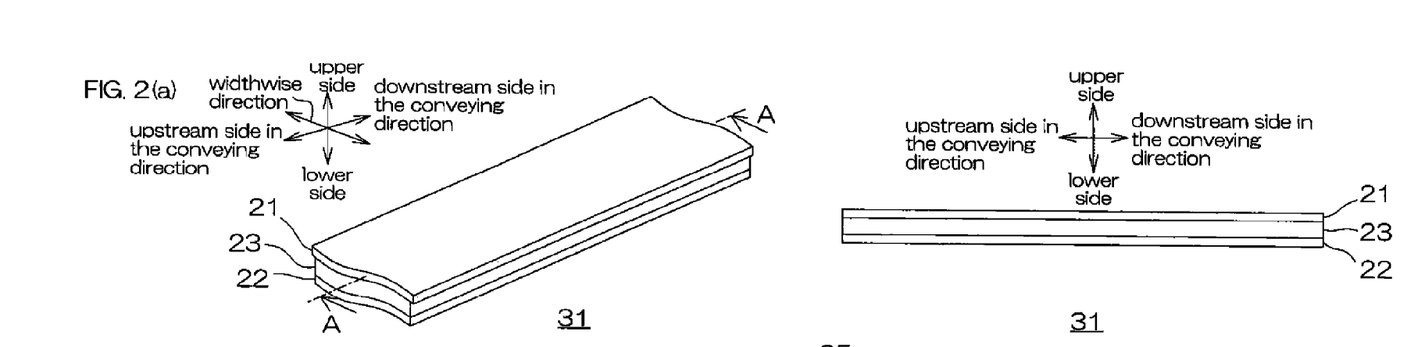
FIG. 2 shows a laminate in a state of being conveyed to each positions of (a), (b), and (c) in the production device in FIG. 1 with the left views showing the respective perspective views and the right views showing A-A sectional views of the respective perspective views.

In this way, as shown in FIG. 2(a), the first laminate 31 composed of the release substrate film 22, the pressure-sensitive adhesive layer 23 that is laminated on the one surface of the release substrate film 22, and the release cover film 21 that is laminated on the one surface of the pressure-sensitive adhesive layer 23 is obtained.

In the first laminate 31, at the side surfaces of the end surfaces in the widthwise direction, the pressure-sensitive adhesive layer 23 is formed to be flush with the release substrate film 22. The release cover film 21 is, in the widthwise direction, formed to be longer than the pressure-sensitive adhesive layer 23 or the release substrate film 22 and is, when projected in the thickness direction, formed so as to include the pressure-sensitive adhesive layer 23 and the release substrate film 22.

Next, the first slits 41 and the second slits 42 are formed in the first laminate 31, so that the second laminate 32 is obtained. That is, in the first laminate 31, the pressure-sensitive adhesive layer 23 and the release cover film 21 are cut so that the first slits 41 are formed, and the release substrate film 22, the pressure-sensitive adhesive layer 23, and the release cover film 21 are cut so that the second slits 42 are formed.

Figure 1:
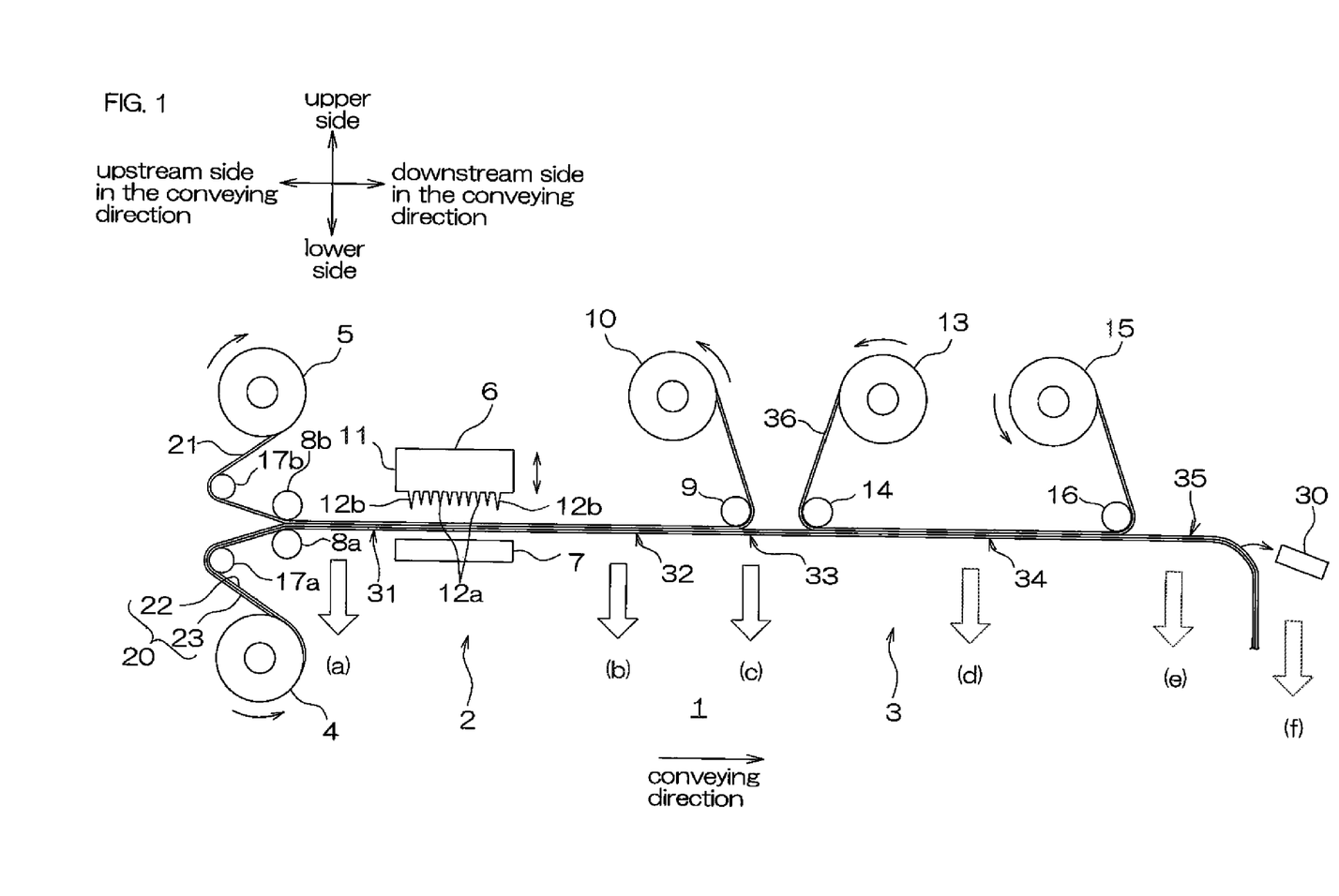
FIG. 1 shows a production device used in one embodiment of a method for producing a patterned pressure-sensitive adhesive body of the present invention.

To be specific, as shown in FIG. 1, when the first laminate 31 passes through the lower side of the punching machine 6, the punching machine 6 is moved toward the lower side and the first blade 12a and the second blade 12b of the punching machine 6 are pressed toward the first laminate 31. At this time, the second blade 12b completely penetrates through the first laminate 31 in the thickness direction. On the other hand, the first blade 12a having a shorter blade than that of the second blade 12b penetrates through the release cover film 21 and the pressure-sensitive adhesive layer 23 only and fails to penetrate through the release substrate film 22.

Figures 2B, 2C:
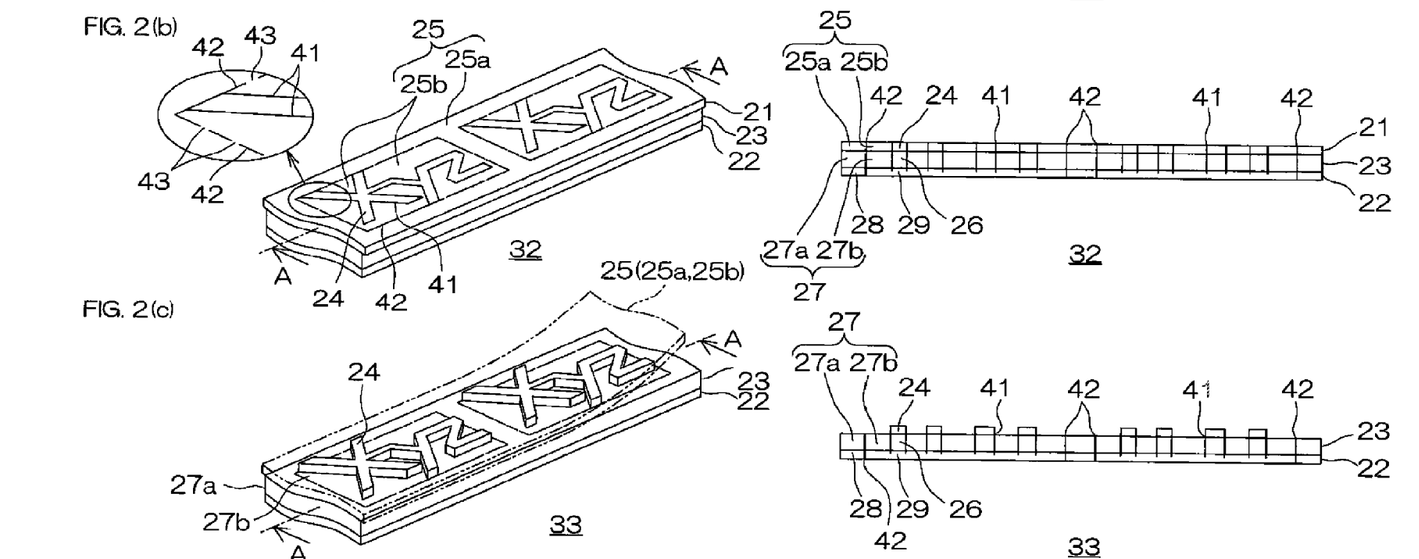

In this way, as shown in FIG. 2 (*b*), the second laminate 32 in which the first slits 41 corresponding to the shape of the first blade 12a and the second slits 42 corresponding to the shape of the second blade 12b are formed is obtained.

As shown by the left view in FIG. 2 (*b*), the first slits 41 are formed into predetermined pattern shapes in plane view. As shown by the right view (the sectional view in the conveying direction) in FIG. 2 (*b*), the first slits 41 are, in the thickness direction, formed from the upper surface of the release cover film 21 to the middle of the release substrate film 22.

By the first slits 41, in the release cover film 21, each of the inner-side portions (a patterned cover film 24) of the first slits 41 in pattern shapes is cut from an outer-side portion 25 of the first slits 41. In the pressure-sensitive adhesive layer 23, each of the inner-side portions (a patterned pressure-sensitive adhesive layer 26) of the first slits 41 in pattern shapes is cut from an outer-side portion 27 of the first slits 41.

As shown by the right view in FIG. 2 (*b*), the second slits 42 are formed from the upper surface of the release cover film 21 through the lower surface of the release substrate film 22. That is, the second slits 42 penetrate through the second laminate 32.

In the left view in FIG. 2 (*b*), each of the second slits 42 is formed into a generally rectangular shape in plane view and includes each of the first slits 41 in the inside thereof. As referred in a partially enlarged view in FIG. 2 (*b*), the second slit 42 is formed so as to have discontinuous portions 43 in the cutting direction (the direction in which the second slit 42 extends). Thus, in the release cover film 21, the outer-side portion (the outer-side cover film 25a as an outer-side second release film) of the second slits 42 is connected to the inner-side portions (the inner-side cover films 25b as inner-side second release films) of each of the second slits 42, which are the outer-side portions of the first slits 41 via the discontinuous portions 43. In the pressure-sensitive adhesive layer 23, the outer-side portion (the outer-side pressure-sensitive adhesive layer 27a) of the second slits 42 is connected to the inner-side portions (the inner-side pressure-sensitive adhesive layers 27b) of each of the second slits 42, which are the outer-side portions of the first slits 41 via the discontinuous portions 43. In the release substrate film 22, the outer-side portion (an outer-side substrate film 28) of the second slits 42 is connected to the inner-side portion (an inner-side substrate film 29) of each of the second slits 42 via the discontinuous portions 43.

In the sectional view in the conveying direction, the first slits 41 are disposed in the inner side of each of the second slits 42.

The discontinuous portions 43 of the second slit 42 correspond to the discontinuous portions of the second blade 12b. That is, the shape of the second slit 42 is formed into a generally rectangular shape having the discontinuous portions 43 in the cutting direction. The generally rectangular shape is not one continuous line and is composed of an intermittent line in which a part thereof is cut by a slight gap.

The discontinuous portions 43 are formed in both sides of the sides (the long sides) in the conveying direction of the second laminate 32 and the sides (the short sides) in the direction perpendicular to the conveying direction thereof. The discontinuous portions 43 in the sides in the direction perpendicular to the conveying direction are formed to be denser than those in the sides in the conveying direction.

The discontinuous portions 43 in the second slits 42 are formed so as not to be positioned at a corner of the rectangular shape.

The length in the conveying direction (the length of the long side) of each of the second slits 42 is, for example, 1 mm or more, preferably 2 mm or more, or furthermore 3 mm or more, and is, for example, 100 mm or less, preferably 80 mm or less, or furthermore 50 mm or less.

The length in the widthwise direction (the length of the short side) of each of the second slits 42 is, for example, 1 mm or more, preferably 2 mm or more, or furthermore 3 mm or more, and is, for example, 50 mm or less, preferably 15 mm or less, or furthermore 10 mm or less.

The length of each of the discontinuous portions 43 is, for example, 0.1 mm or more, preferably 0.5 mm or more, or furthermore 1 mm or more, and is, for example, 20 mm or less, preferably 10 mm or less, or furthermore 5 mm or less.

The number of the discontinuous portions 43 is, in the sides (the long sides) in the conveying direction, per one side, for example, 1 or more, preferably 2 or more, or more preferably 5 or more, and is, for example, 100 or less, preferably 80 or less, or more preferably 50 or less.

The number of the discontinuous portions 43 is, in the sides (the short sides) in the direction perpendicular to the conveying direction, per one side, for example, 1 or more, preferably 2 or more, or more preferably 5 or more, and is, for example, 100 or less, preferably 80 or less, or more preferably 50 or less.

The first slits 41 and the second slits 42 are formed in the first laminate 31 so that the area of each of the patterned portions (each of the inner-side portions of the first slits 41) at the downstream side in the conveying direction is reduced. To be specific, each of the patterned portions is divided into a right-side portion and a left-side portion in the conveying direction with the center of the long side of the second slit 42 (the outer frame) as a reference. Then, the area (that is, the area of the patterned cover film 24 that is formed) of each of the patterned portions, which is formed in the right-side portion and the left-side portion, is calculated and the portion having less area (the right-side portion or the left-side portion) is disposed at the downstream side in the conveying direction. In order to have the formation in this manner, the punching machine 6 may be rotated by 180 degrees clockwise (or counter-clockwise) in plane view in accordance with the pattern shape.

Next, the outer-side cover film 25a and the inner-side cover films 25b are peeled from the second laminate 32, so that the third laminate 33 is obtained. That is, the outer-side cover film 25a, along with the inner-side cover films 25b via the continuous portions 43, is peeled from the pressure-sensitive adhesive layer 23 in the second laminate 32.

To be specific, the lower surface of the first tension roll 9 is brought into contact with the second laminate 32, the one end portion of the outer-side cover film 25a is fixed to the cover film-winding roll 10, and the cover film-winding roll 10 is rotated so as to wind the outer-side cover film 25a.

At this time, as shown by the phantom line in the left view in FIG. 2 (*c*), the outer-side cover film 25a is pulled upwardly with respect to the conveying direction, so that the outer-side cover film 25a is peeled from the pressure-sensitive adhesive layer 23. Also, the inner-side cover films 25b that are connected to the outer-side cover film 25a via the discontinuous portions 43 are pulled upwardly, so that the inner-side cover films 25b are peeled from the pressure-sensitive adhesive layer 23.

In this way, as shown in FIG. 2 (*c*), the third laminate 33 composed of the release substrate film 22 in which the second slits 42 are formed, the pressure-sensitive adhesive layer 23 that is laminated on the upper surface thereof and in which the first slits 41 and the second slits 42 are formed, and the patterned cover films 24 that are laminated on the upper surface thereof and are formed in pattern shapes is obtained.

Next, the residue-removing film 36 is laminated on the third laminate 33, so that the fourth laminate 34 is obtained. That is, the residue-removing film 36 is laminated on the surfaces of the patterned cover films 24 and the exposed surfaces of the pressure-sensitive adhesive layer 23 in the third laminate 33.

To be specific, the residue-removing film 36 is sent from the residue-removing film-sending roll 13 and the residue-removing film 36 is allowed to pass through the lower surface of the third laminate roll 14 to be brought into contact with the third laminate 33 that is conveyed.

In this way, the fourth laminate 34 is obtained. As shown in FIG. 3 (*d*), the fourth laminate 34 is composed of the release substrate film 22 in which the second slits 42 are formed, the pressure-sensitive adhesive layer 23 that is laminated on the upper surface thereof and in which the first slits 41 and the second slits 42 are formed, the patterned cover films 24 that are laminated on the upper surface thereof and are formed into pattern shapes, and the residue-removing film 36 that is laminated on the upper surfaces thereof The residue-removing film 36 is formed into a long-length generally rectangular shape in plane view and the length thereof in the widthwise direction is formed to be slightly longer than the length in the widthwise direction of the pressure-sensitive adhesive layer 23.

The thickness of the residue-removing film 36 is, for example, 10 µm or more, or preferably 15 µm or more, and is, for example, 300 µm or less, or preferably 100 µm or less.

In the residue-removing film 36, the surface that is brought into contact with the third laminate 33 is configured to be attached to the pressure-sensitive adhesive layer 23 and to be easily fixed thereto. To be specific, the surface is configured to allow the residue-removing film 36 to adhere to the pressure-sensitive adhesive layer 23 and to allow the peeling force at the time of peeling the residue-removing film 36 and the pressure-sensitive adhesive layer 23 to be larger than that at the time of peeling the release substrate film 22 and the pressure-sensitive adhesive layer 23.

A material that forms the residue-removing film 36 is appropriately set from the above-described material that forms the release cover film 21. When the material that is easily peeled off is set, the surface of the residue-removing film 36 is subjected to surface treatment so as to be easily peeled off.

Next, the outer-side pressure-sensitive adhesive layer 27a and the inner-side pressure-sensitive adhesive layers 27b, along with the residue-removing film 36, are peeled from the fourth laminate 34, so that the fifth laminate 35 is obtained. That is, the residue-removing film 36, and the outer-side pressure-sensitive adhesive layer 27a and the inner-side pressure-sensitive adhesive layers 27b that are attached to the residue-removing film 36 are peeled from the release substrate film 22.

To be specific, the lower surface of the second tension roll 16 is brought into contact with the fourth laminate 34, the one end portion of the residue-removing film 36 is fixed to the residue-removing film-winding roll 15, and the residue-removing film-winding roll 15 is rotated so as to wind the residue-removing film 36.

At this time, the residue-removing film 36 is pulled upwardly with respect to the conveying direction, and the inner-side pressure-sensitive adhesive layers 27b and the outer-side pressure-sensitive adhesive layer 27a that are attached to the residue-removing film 36 are also pulled. As a result, the inner-side pressure-sensitive adhesive layers 27b and the outer-side pressure-sensitive adhesive layer 27a are peeled from the interface between the inner-side pressure-sensitive adhesive layers 27b and the outer-side pressure-sensitive adhesive layer 27a, and the release substrate film 22, so that the outer-side pressure-sensitive adhesive layer 27a and the inner-side pressure-sensitive adhesive layers 27b, along with the residue-removing film 36, are wound around the residue-removing film-winding roll 15. The patterned shape portions (the inner-side portions of the first slits 41) in the pressure-sensitive adhesive layer 23 are in a state of being attached to the release substrate film 22 because the patterned cover films 24 that are laminated on the upper surfaces thereof are not attached to the residue-removing film 36.

In this way, the fifth laminate 35 is obtained. As shown in FIG. 3 (*e*), the fifth laminate 35 is composed of the release substrate film 22 in which the second slits 42 are formed, the patterned pressure-sensitive adhesive layers 26 that are laminated on the release substrate film 22 and are formed into pattern shapes, and the patterned cover films 24 that are laminated on the patterned pressure-sensitive adhesive layers 26 and are formed into pattern shapes having the same shapes as those of the patterned pressure-sensitive adhesive layers 26.

Next, each of the patterned pressure-sensitive adhesive bodies 30 is taken out from the fifth laminate 35. That is, the inner-side substrate film 29 in the inside of each of the second slits 42 and the outer-side substrate film 28 are cut off from the fifth laminate 35.

To be specific, the discontinuous portions 43 in the second slits 42 in the release substrate film 22 are fractured by application of a predetermined pressure in the thickness direction thereof manually, with a pressing machine, or the like.

In this way, each of the patterned pressure-sensitive adhesive bodies 30 is obtained.

Figure 3D:
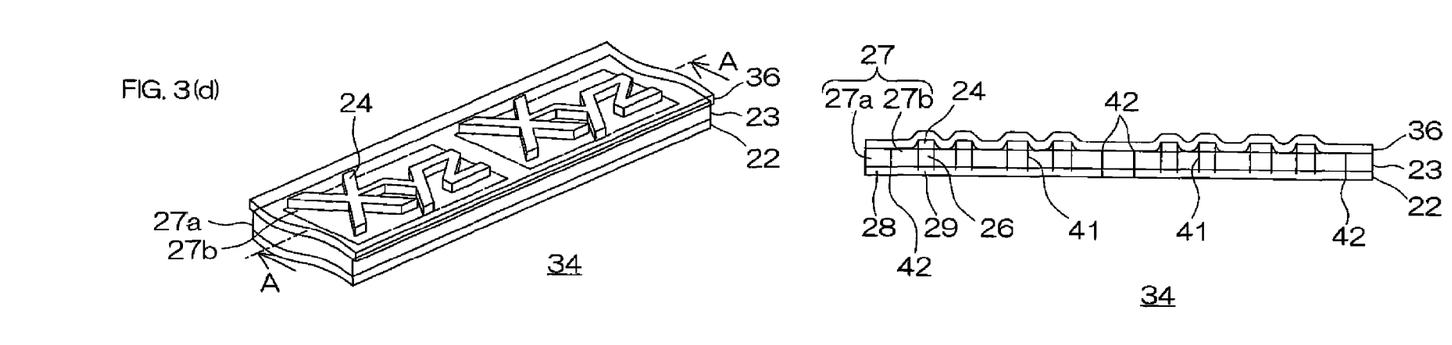
FIG. 3 shows a laminate in a state of being conveyed to each positions of (d), (e), and (f) in the production device in FIG. 1 with the left views showing the respective perspective views and the right views showing A-A sectional views of the respective perspective views.
Figure 3E:
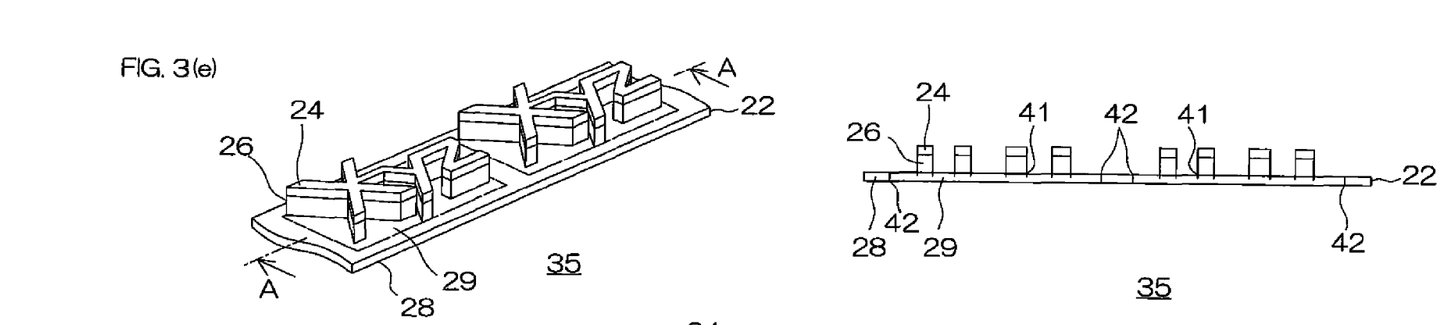
Figure 3F:
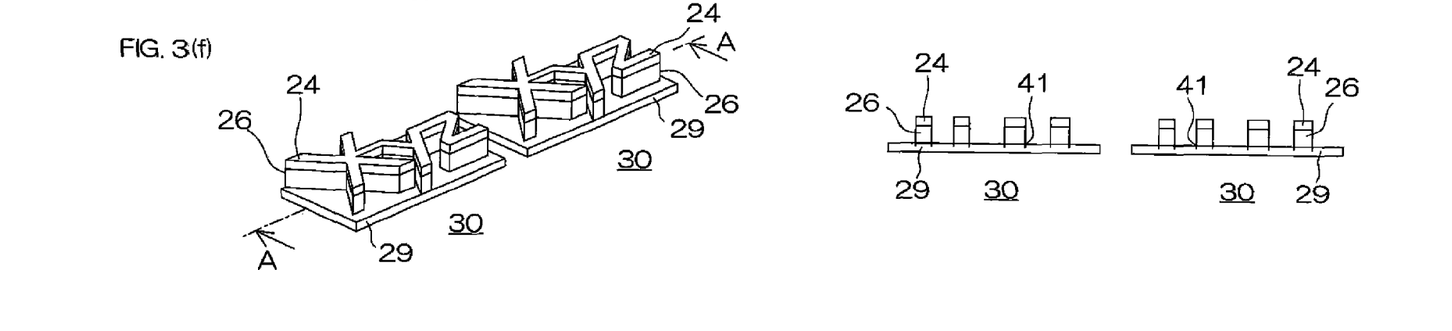

As shown in FIG. 3 (*f*), each of the patterned pressure-sensitive adhesive bodies 30 is composed of the inner-side substrate film 29, the patterned pressure-sensitive adhesive layer 26 that is laminated on the inner-side substrate film 29 and is formed into a pattern shape, and the patterned cover film 24 that is laminated on the patterned pressure-sensitive adhesive layer 26 and is formed into a pattern shape having the same shape as that of the patterned pressure-sensitive adhesive layer 26.

The patterned pressure-sensitive adhesive layer 26, when projected in the thickness direction, includes the patterned cover film 24 and the side surfaces of the patterned pressure-sensitive adhesive layer 26 are flush with those of the patterned cover film 24.

The inner-side substrate film 29 is formed into a generally rectangular shape (an outer frame shape) in plane view and when projected in the thickness direction, includes the patterned pressure-sensitive adhesive layer 26 and the patterned cover film 24.

The patterned pressure-sensitive adhesive body 30 obtained in this way is capable of being used as a double-coated pressure-sensitive adhesive tape for attaching an emblem for automobiles such as a car and an motor cycle; an emblem of household electric appliances, electrical/electronic devices, and machine tools; indication at buildings including housing, an office, or the like; and a decorative article to an object to be attached.

The method for producing the patterned pressure-sensitive adhesive body 30 includes a pattern forming step of cutting the pressure-sensitive adhesive layer 23 in the pressure-sensitive adhesive film 20 including the release substrate film 22 and the pressure-sensitive adhesive layer 23 that is laminated on the one surface of the release substrate film 22 so as to form the first slits 41 in pattern shapes and an outer frame forming step of cutting the release substrate film 22 and the pressure-sensitive adhesive layer 23 so as to form the second slits 42 in outer frame shapes surrounding the pattern shapes. The second slits 42 have the discontinuous portions 43 in the cutting direction.

Thus, when the outer-side pressure-sensitive adhesive layer 27a that is disposed at the outer side of the second slits 42 is peeled from the release substrate film 22, simultaneously, the inner-side pressure-sensitive adhesive layers 27b (the residues) that is disposed at the inner side of each of the second slits 42 and at the outer side of the first slits 41 via the discontinuous portions 43 are capable of being peeled from the release substrate film 22.

According to the method for producing the patterned pressure-sensitive adhesive body 30, the release cover film 21 is laminated on the one surface of the pressure-sensitive adhesive layer 23; in the pattern forming step, the pressure-sensitive adhesive layer 23 and the release cover film 21 are cut so as to form the first slits 41; and in the outer frame forming step, the release substrate film 22, the pressure-sensitive adhesive layer 23, and the release cover film 21 are cut so as to form the second slits 42.

Thus, when the outer-side pressure-sensitive adhesive layer 27a and the outer-side cover film 25a that are disposed at the outer side of each of the second slits 42 are peeled from the release substrate film 22, the inner-side pressure-sensitive adhesive layers 27b and the inner-side cover films 25b (the residues) that are disposed at the inner side of each of the second slits 42 and at the outer side of the first slits 41 via the discontinuous portions 43 are also capable of being simultaneously peeled from the release substrate film 22.

According to the method for producing the patterned pressure-sensitive adhesive body 30, after the pattern forming step and the outer frame forming step, the outer-side cover film 25a that is disposed at the outer side of the second slits 42 and the inner-side cover films 25b, each of which is continuous to the outer-side cover film 25a via the discontinuous portions 43 and is disposed at the inner side of each of the second slits 42 are peeled from the pressure-sensitive adhesive layer 23, and the outer-side pressure-sensitive adhesive layer 27a that is disposed at the outer side of the second slits 42 and the inner-side pressure-sensitive adhesive layers 27b, each of which is continuous to the outer-side pressure-sensitive adhesive layer 27a via the discontinuous portions 43 and is disposed at the inner side of each of the second slits 42 are peeled from the release substrate film 22.

Thus, the manual operation of peeling off the inner-side pressure-sensitive adhesive layers 27b and the inner-side cover films 25b (the residues) is capable of being reduced or omitted, so that the production efficiency of the patterned pressure-sensitive adhesive body 30 is capable of being substantially improved.

In the method for producing the patterned pressure-sensitive adhesive body 30, the pattern forming step and the outer frame forming step are simultaneously performed.

Thus, the first slits 41 and the second slits 42 are simultaneously formed in the pressure-sensitive adhesive film 20.

As a result, the production efficiency of the patterned pressure-sensitive adhesive body 30 is further improved.

In the embodiment using the production device 1 in FIG. 1, the release cover film 21 is laminated on the pressure-sensitive adhesive film 20 including the release substrate film 22 and the pressure-sensitive adhesive layer 23 that is laminated on the one surface of the release substrate film 22, so that the patterned pressure-sensitive adhesive body 30 is produced. Alternatively, for example, though not shown, the patterned pressure-sensitive adhesive body 30 is capable of being produced without laminating the release cover film 21 on the pressure-sensitive adhesive film 20.

In a case where the release cover film 21 is not laminated on the pressure-sensitive adhesive film 20, the production device 1 may not be required to include the cover film-sending roll 5, the cover film-winding roll 10, and the first tension roll 9.

In the residue-removing film 36, the patterned pressure-sensitive adhesive layers 26 are exposed, so that in the residue-removing film 36 in the embodiment in FIG. 1, the patterned portions of the patterned pressure-sensitive adhesive layers 26 are also peeled off Thus, for example, the release treatment is applied to the portion in which the residue-removing film 36 is overlapped with the patterned pressure-sensitive adhesive layer 26 at the time of laminating the residue-removing film 36 and the third laminate 33 and being projected in the thickness direction so that the patterned pressure-sensitive adhesive layers 26 are not strongly attached to the residue-removing film 36. For example, the release treatment is applied to the surface at the center in the widthwise direction (the surface excluding a portion that corresponds to the outer-side portion of the second slits 42 in the widthwise direction) of the residue-removing film 36.

In this way, the outer-side pressure-sensitive adhesive layer 27a is pulled to be peeled off by the residue-removing film 36 and simultaneously, the inner-side pressure-sensitive adhesive layers 27b that are connected thereto via the discontinuous portions 43 are also pulled to be peeled off As a result, the manual operation of peeling off the inner-side pressure-sensitive adhesive layers 27b (the residues) is capable of being reduced or omitted, so that the production efficiency of the patterned pressure-sensitive adhesive body 30 is capable of being substantially improved.

Figure 4:
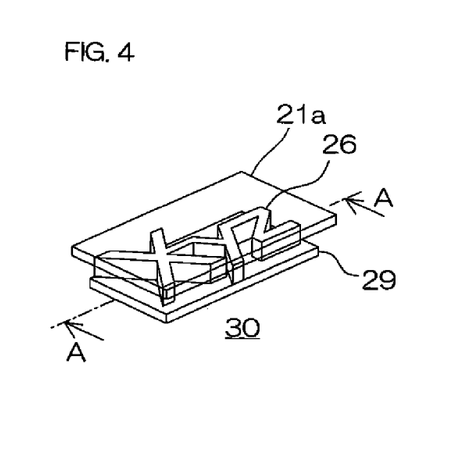
FIG. 4 shows another embodiment of a patterned pressure-sensitive adhesive body obtained in the producing method of the present invention with the left view showing a perspective view of the patterned pressure-sensitive adhesive body and the right view showing an A-A sectional view of the perspective view.

In the embodiment in FIG. 3 (f), the patterned cover films 24 that are formed in pattern shapes are laminated on the patterned pressure-sensitive adhesive layers 26. Alternatively, for example, as shown in FIG. 4, a release cover film 21a in a generally rectangular shape in plane view is also capable of being laminated on the patterned pressure-sensitive adhesive layer 26.

In the release cover film 21a in a generally rectangular shape in plane view, the length (the short side) thereof in the widthwise direction and the length (the long side) thereof in the conveying direction are longer than those of the inner-side substrate film 29. The release cover film 21a in a generally rectangular shape in plane view is formed so as to include the inner-side substrate film 29 and the patterned pressure-sensitive adhesive layer 26 when projected in the thickness direction.

By using the release cover film 21a in a generally rectangular shape in plane view, the peeling of the release cover film 21a at the time of its use becomes easier, so that the usability of the patterned pressure-sensitive adhesive body 30 becomes excellent.

The patterned pressure-sensitive adhesive body 30 in FIG. 4 with respect to the patterned pressure-sensitive adhesive body 30 in FIG. 3 (f) is obtained as follows: the patterned cover film 24 is peeled off and the release cover film 21a in a generally rectangular shape in plane view is laminated on the upper surface of the patterned pressure-sensitive adhesive layer 26 in the peeled patterned pressure-sensitive adhesive body 30.

Figure 5:
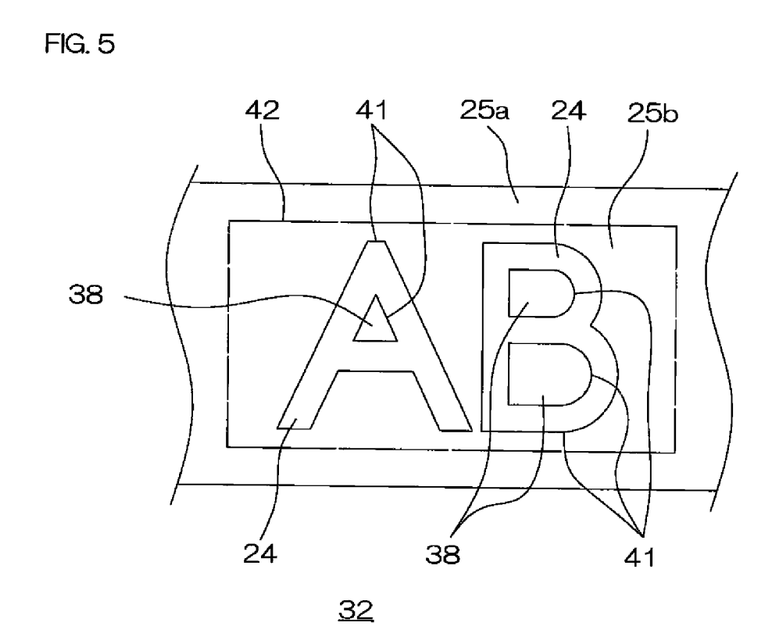
FIG. 5 shows a plan view of another embodiment of a patterned pressure-sensitive adhesive body obtained in the producing method of the present invention.

In the second laminate 32 in FIG. 2 (b), the first slits 41 in pattern shapes are formed so that all of a plurality of the inner-side cover films 25b are adjacent to the outer-side cover film 25a (consequently, all of a plurality of the inner-side pressure-sensitive adhesive layers 27b are adjacent to the outer-side pressure-sensitive adhesive layer 27a). Alternatively, for example, as shown in FIG. 5, the first slits 41 in pattern shapes where a cover film portion (a closed surface cover film 38, a residue) that is not adjacent to the outer-side cover film 25a is generated may be formed. In such a case, though not shown, at the lower side of the closed cover film 38, a pressure-sensitive adhesive layer portion (a closed surface pressure-sensitive adhesive layer, a residue) that is in the same shape as that in plane view and is not adjacent to the outer-side pressure-sensitive adhesive layer 27a is generated.

At this time, in the next step, the closed surface cover film 38 is not peeled off, along with the outer-side cover film 25a, via the discontinuous portions. The closed surface pressure-sensitive adhesive layer is not peeled off, along with the outer-side pressure-sensitive adhesive layer 27a, via the discontinuous portions. In this case, the closed surface cover film 38 and the closed surface pressure-sensitive adhesive layer are capable of being removed manually or by pressing after the patterned pressure-sensitive adhesive body 30 is taken out from the fifth laminate 35.

In the embodiment in FIG. 5, the inner-side cover films 25b and the inner-side pressure-sensitive adhesive layers 27b are peeled off at the same time with the outer-side cover film 25a and the outer-side pressure-sensitive adhesive layer 27a in the same manner as the embodiments in which the pattern shapes in FIGS. 2 and 3 are formed, so that the same effect as that in the embodiments in FIGS. 2 and 3 can be achieved.

The outer shape (that is, the outer frame shape and the shape of the second slit 42) of the release substrate film 22 in the patterned pressure-sensitive adhesive body 30 in FIG. 3 (f) is formed into a generally rectangular shape in plane view. Alternatively, for example, though not shown, the outer shape thereof may be a generally circular shape, an elliptical shape, or a polygonal shape other than the rectangular shape in plane view.

In the second laminate 32 in FIG. 2 (b), the discontinuous portions 43 in the second slits 42 are not provided at a corner of the outer frame shape (the rectangular shape). Alternatively, for example, though not shown, the discontinuous portions 43 can be also provided at a corner of the rectangular shape. In the step of peeling the outer-side cover film 25a and the inner-side cover films 25b from the second laminate 32, in view of capable of easily peeling the inner-side cover films 25b along with the outer-side cover film 25a, preferably, the discontinuous portios 43 in the second slits 42 are not provided at a corner of the outer frame shape.

In FIG. 2 (b), the first slits 41 and the second slits 42 are simultaneously formed in the first laminate 31. Alternatively, for example, though not shown, after the first slits 41 are formed in the first laminate 31, the second slits 42 may be formed in the first laminate 31, or after the second slits 42 are formed in the first laminate 31, the first slits 41 may be formed in the first laminate 31.

In the production step of the patterned pressure-sensitive adhesive body 30 in FIG. 3 (f), the first slits 41 and the second slits 42 are formed by being stamped out with the punching machine 6. Alternatively, for example, though not shown, the first slits 41 and the second slits 42 can be formed with a laser or the like.

In order to accurately adjust the attaching position of the patterned pressure-sensitive adhesive body 30 with an object to be attached when the patterned pressure-sensitive adhesive body 30 is attached to the object to be attached, one or two or more markings such as positioning holes (not shown) can be formed in the central portion or the circumference end portion of the inner-side substrate film 29.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

What is claimed is:

1. A method for producing a patterned pressure-sensitive adhesive body comprising:
   a pattern forming step of cutting a pressure-sensitive adhesive layer in a pressure-sensitive adhesive film including a first release film and the pressure-sensitive adhesive layer laminated on one surface of the first release film so as to form a first slit in a pattern shape and
   an outer frame forming step of cutting the first release film and the pressure-sensitive adhesive layer so as to form a second slit in an outer frame shape surrounding the pattern shape,
   wherein the second slit has a plurality of discontinuous portions in a cutting direction; and
   wherein the outer frame shape of the second slit is composed of an intermittent line formed by the discontinuous portions and surrounding the pattern shape.

2. The method for producing a patterned pressure-sensitive adhesive body according to claim 1, wherein
   after the pattern forming step and the outer frame forming step,
   an outer-side pressure-sensitive adhesive layer that is disposed at the outer side of the second slit and an inner-side pressure-sensitive adhesive layer that is continuous to the outer-side pressure-sensitive adhesive layer via the discontinuous portions and is disposed at the inner side of the second slit are peeled from the first release film.

3. The method for producing a patterned pressure-sensitive adhesive body according to claim 1, wherein
   a second release film is laminated on one surface of the pressure-sensitive adhesive layer;
   in the pattern forming step, the pressure-sensitive adhesive layer and the second release film are cut so as to form the first slit; and
   in the outer frame forming step, the first release film, the pressure-sensitive adhesive layer, and the second release film are cut so as to form the second slit.

4. The method for producing a patterned pressure-sensitive adhesive body according to claim 3, wherein
   after the pattern forming step and the outer frame forming step,
   an outer-side second release film that is disposed at the outer side of the second slit and an inner-side second release film that is continuous to the outer-side second release film via the discontinuous portions and is disposed at the inner side of the second slit are peeled from the pressure-sensitive adhesive layer, and
   an outer-side pressure-sensitive adhesive layer that is disposed at the outer side of the second slit and an inner-side pressure-sensitive adhesive layer that is continuous to the outer-side pressure-sensitive adhesive layer via the discontinuous portions and is disposed at the inner side of the second slit are peeled from the first release film.

5. The method for producing a patterned pressure-sensitive adhesive body according to claim 1, wherein
   the pattern forming step and the outer frame forming step are simultaneously performed.

\* \* \* \* \*